Patented May 2, 1944

2,347,970

UNITED STATES PATENT OFFICE 2,347,970

POLYCARBOXYLIC ACIDS AND ANHYDRIDES DERIVED FROM POLYMERS OF ACYCLIC TERPENES AND METHOD FOR THEIR PRODUCTION

Alfred L. Rummelsburg, Wilmington, Del., assignor to Hercules Powder Company, Wilmington, Del., a corporation of Delaware No Drawing. Application May 31, 1941,
Serial No. 396,223

17 Claims. (Cl. 260—78)

This invention relates to polycarboxylic acids and anhydrides derived from polymers of acyclic terpenes having three double bonds per molecule. It particularly relates to the polycarboxylic acids and anhydrides derived from the dipolymers of such acyclic terpenes by condensation with maleic anhydride.

The prior art is acquainted with the fact that useful products result from the condensation of terpenes, both mono- and bicyclic, with maleic anhydride. For example, α-phellandrene, α-terpinene, terpinolene, α-pinene, etc. react with maleic anhydride to give various dibasic acid anhydrides. It is also known that certain terpenes, such as, α-phellandrene, α-pinene, etc., may be converted into their respective dimers with, for example, phosphoric acid, and the product reacted with maleic anhydride under suitable conditions to form desirable condensation products. However, when the dimers or higher polymers of the aforesaid terpenes are employed in the reaction, longer reaction periods are generally required or more drastic conditions for the reaction are required as compared with the use of unpolymerized terpenes. Furthermore, lower yields are generally obtained when the dimer or higher terpene polymers are employed. In conjunction with the lower yields of condensate obtained, the product is relatively dark in color as a consequence of the extended period or more drastic conditions of reaction.

It has been found that by the use of a polymer of an acyclic terpene having three double bonds per molecule, and in particular the dimer of allo-ocimene, a terpene having a triply conjugated system of double bonds, condensation with maleic anhydride proceeds with relative ease when compared with the polymerized terpenes hereinbefore mentioned. Hereinafter, in this specification such an acyclic terpene having three double bonds per molecule will be referred to for convenience merely as an acyclic terpene. When such a polymerized acyclic terpene is employed, the yield of condensate more nearly approaches the theoretical, and the condensate itself is characterized by having distinctly lighter color than that of the condensates of the prior art. Inasmuch as these resinous condensates or their monohydric or polyhydric alcohol esters are suitable for use in the protective coating and plastic industries, color is an exceedingly important characteristic; and it is often the determinative characteristic as to whether a particular resin may be employed.

Furthermore, as a consequence of the improved reactivity of the polymer of the acyclic terpenes hereinbefore mentioned, and particularly the dimers, the resulting condensation products with maleic anhydride will have substantially higher acid numbers than those of the condensation products of the prior art. The foregoing statement, it will be understood, refers to condensation products from which any unreacted maleic anhydride has been removed. Having higher acid numbers, the products of this invention have greater reactivity with mono- and polyhydric alcohols.

In accordance with this invention, there will be employed a polymer of any acyclic terpene having three double bonds in its monomeric form. Thus, allo-ocimene, ocimene, or myrcene may be employed. In particular, however, a polymer of allo-ocimene will be employed, and it is most preferable to employ the substantially pure dimer thereof.

To obtain the polymeric form from the monomer, any of the processes known in the art are contemplated. Thus, for example, in the case of allo-ocimene, it is desired to include allo-ocimene polymerized with phosphoric acid catalysts, such as, orthophosphoric acid, tetraphosphoric acid, hypophosphoric acid, metaphosphoric acid, pyrophosphoric acid, etc.; metal halide catalysts, such as, stannic chloride, aluminum chloride, zinc chloride, boron trifluoride and its molecular complexes with ethers and acids, etc.; hydrogen fluoride; sulfuric acid, aromatic sulfonic acids, such as, p-toluene sulfonic acid, etc.; and adsorbents, such as, fuller's earth, silica gel, alumina, bauxite, activated magnesium silicates, etc. In addition, polymerization may be carried out by means of heating the monomeric allo-ocimene at elevated temperatures, such as, for example, between about 190° C. and about 250° C., without the use of a catalyst. The polymerization may be carried out with or without the use of an inert, volatile, organic solvent, such as, benzene, xylene, gasoline, ethylene dichloride, etc. For additional information relating to the particular procedures which may be employed, see my co-pending applications for United States Letters Patent, Serial No. 370,664, filed December 18, 1940, and Serial No. 370,665, filed December 18, 1940.

As heretofore stated, the substantially pure dimer of an acyclic terpene is preferably employed in carrying out the condensation reaction. Thereby, higher yields and paler colored products result. When the polymerization is carried out with a phosphoric acid catalyst, a liquid product is formed comprising a substantial quantity of the dimer. In actual practice, the product will contain from about 75% to about 95% of the dimer, depending upon the conditions of reaction, such as, type of phosphoric acid employed, the concentration of catalyst, the particular solvent, the temperature of reaction, etc. The thiocyanate value of the product will vary from about 120 to about 240. After the catalyst has been removed, the substantially pure dimer may be separated from the remaining constituents by distillation, preferably in vacuo and over a small amount of alkali. Thereby, traces of higher polymers, for example, trimers, also traces of catalyst which may have been left in the product and oxidation products may be separated as residue from the distillation. The substantially pure dimer in the case of allo-ocimene will have a thiocyanate value between about 170 and about 200. It will have, in addition, the following average characteristics:

Boiling point_____ 142–143° C. at 4 mm.
$d_c^{23}$ _____ 0.8654
$n_d^{23}$ _____ 1.508

Due to the presence of isomers of the dimer, which probably have divergent boiling points, the dimer does not distill over completely within the narrow temperature range supra but actually distills over a much wider range. Thus, it has been found that a fraction distilling at from 140° C. to 185° C. and at from 2 to 5 millimeters pressure is the substantially pure dimer.

In carrying out the polymerization of an acyclic terpene with metal halide catalysts, liquid polymers may also be obtained by following the procedure of my application for United States Letters Patent, Serial No. 370,664, filed December 18, 1940; however, by employing particular metal halides and suitably controlling the conditions of the reaction, solid polymers of acyclic terpenes result. For example, when a metal chloride, and preferably aluminum chloride, is used, generally solid polymers result. These solid polymers are formed when the reaction is carried out over wide ranges of temperature using various inert solvents. Preferably, however, to form solid polymers, the reaction is carried out at a temperature within the range of from about −35° C. to about 60° C. with the acyclic terpene dissolved in a halogenated organic solvent, such as, ethylene dichloride, etc.

These solid polymers contain substantial quantities of polymeric constituents higher than the dimer. It has been determined that these organic solids have at least about 70% of polymeric constituents higher than the dimer. They are further characterized by having lower thiocyanate values than the liquid polymers, the values for the former falling within the range of from about 20 to about 80.

In accordance with this invention, the condensation reaction may be carried out employing approximately equi-molar proportions of the polymerized acyclic terpene and the maleic anhydride, or an excess of either of the reactants may be employed. It is believed, however, that equi-molar proportions of the reactants combine in the reaction which follows. The reactants will be contacted and preferably with agitation. A suitable inert solvent may be employed for the reactants as desired. The mechanics of promoting the condensation may be modified, if desired, by passing the required quantity of the gaseous maleic anhydride into the heated polymer or its solution with agitation. Preferably, the gaseous anhydride will be introduced admixed with an inert gas.

The condensation reaction will be carried out at a suitably elevated temperature which will fall generally within the range of from about 150° C. to about 300° C., the preferable range being from about 175° C. to about 250° C. The reaction period may vary between about ¼ hour and 10 hours, preferably, between about 1 and 5 hours, depending upon the temperature. Various inert solvents may, if desired, be employed. Thus, for example, tetrahydro naphthalene, decahydronaphthalene, Hi-Flash naphtha, also the chlorinated diphenyls may be employed. The use of an inert atmosphere, such as, $CO_2$ or $N_2$, during the reaction will facilitate production of the palest colored products.

When an excess of maleic anhydride is employed and suitable conditions employed to promote condensation, the unreacted maleic anhydride can be removed from the reaction mixture by vacuum distillation. Any unreacted polymerized acyclic terpene can also be removed by further vacuum distillation, leaving the condensate as residue. If desired, excess maleic anhydride may be removed by water washing, but this procedure is less preferable. When, however, the condensation is carried out using an excess of polymerized acyclic terpene, the excess may be removed by vacuum distillation, leaving the condensate as the residue. The recovered polymerized acyclic terpene may be retreated with maleic anhydride. However, it is possible for a small amount of the polymer to have isomerized to a non-reactive state in the presence of the anhydride. The re-use of the recovered polymer may thereby entail lower yields of condensate.

The condensate may be further refined with adsorbents, such as, fuller's earth, activated carbon, bauxite, silica gel, alumina, Filter-cel (kieselguhr), activated magnesium silicates, etc.; selective solvents, such as, furfural phenol, alkyl thiocyanates, etc.; precipitants, such as, stannic chloride, etc.; and mineral acids, such as, sulfuric and phosphoric acid. Inert solvents must be employed during refining. Petroleum hydrocarbons may be used and, less preferably so, monocyclic aromatic hydrocarbons. In addition to the aforesaid refining treatments, the condensates may be bleached by heating to temperatures of from 250° to 350° C., preferably from 275° C. to 325° C. for from 5 minutes to 1 hour or more, in an inert atmosphere.

When the substantially pure dimer of allo-ocimene is employed, together with a slight excess of maleic anhydride, the yield is between about 70% and about 95% of the theoretical, based on the allo-ocimene dimer. The product is an amber-colored solid ranging from G to I on the rosin color scale; it has a melting point by the Hercules drop method of between about 75° C. and about 95° C.; and it has an acid number (pyridine) of from about 290 to 340. The trimer and higher polymers of allo-ocimene yield darker colored products having substantially higher melting points, but in lower yields.

Although it is generally desirable to use a substantially pure acyclic terpene in the preparation of the respective polymer, it is possible to employ an impure acyclic terpene mixture such as that obtained from the pyrolysis of α-pinene or β-pinene. Thus, the pyrolysis of β-pinene has been found to yield myrcene to the extent of as much as 70% along with small amounts of various monocyclic terpenes. The pyrolysis of α- pinene yields as much as 40% allo-ocimene in conjunction with α-pinene, dipentene and relatively small amounts of unidentified complex terpenes. Such terpene mixtures may be further concentrated with respect to the myrcene or allo-ocimene if desired. The allo-ocimene in such a crude pyrolysis mixture or concentrated pyrolysis mixture as obtained from α-pinene may be polymerized to the dimer by subjecting said mixture or its concentrate to heat or to the action of mild polymerization catalysts, such as, orthophosphoric acid, tetraphosphoric acid, hypophosphoric acid, etc. Under these conditions, minimum amounts of the dimers and traces of higher polymers of cyclic terpenes will be present in the allo-ocimene polymer as impurities. While vacuum distillation can separate all the dimers present from the trimers and higher polymers, it is not possible to separate in this manner cyclic terpene dimers from allo-ocimene dimers. Accordingly, the product will contain the allo-ocimene dimer in conjunction with other terpene dimers as impurities. This impure dimer may then be treated with maleic anhydride at relatively low temperatures, such as, between about 175° C. to about 250° C. Only the allo-ocimene dimer in the impure dimer reacts with the maleic anhydride in substantial quantity. It is therefore possible to separate the condensation product of the allo-ocimene dimer with maleic anhydride from the unreacted terpene dimers by vacuum distillation.

There follow specific examples which illustrate particular embodiments of the processes of this invention. These examples, however, are not to be taken as limiting in any way. All parts and percentages are by weight unless otherwise indicated.

*Example 1*

Two hundred and fifty parts of 97% allo-ocimene were vigorously agitated with 60 parts of 85% orthophosphoric acid at 25 to 30° C. for a period of 30 hours. The orthophosphoric acid was then separated, and the product water washed. The unpolymerized terpenes were removed from the resulting product by means of vacuo distillation at 18 mm., leaving 240 parts of residue. The residue which consisted of polymerized allo-ocimene was vacuum distilled as follows:

| Fraction | Weight | Vapor temp. | Pressure |
| --- | --- | --- | --- |
|  | Parts | °C. | Mm. |
| 1 | 15 | 136 to 142 | 2 to 4 |
| 2 | 190 | 139 to 180 | 2 to 5 |
| Residue | 33 | (¹) |  |

¹ Dark colored solid.

Fraction 2 had a molar weight of 265 (Rast) and a thiocyanate number of 189. To 100 parts of fraction 2 which consisted substantially entirely of the dimer of allo-ocimene were added 40 parts of maleic anhydride, and the mixture was heated for 2 hours at 210 to 220° C. with agitation under an air condenser. Vacuum distillation of the reaction mixture at a bath temperature of 210 to 240° C. and a pressure of 10 mm. left 120 parts of condensate as residue which corresponded with a yield of 88.0% on the basis of the allo-ocimene dimer. The condensate had an acid number (pyridine) of 330, a drop melting point of 83° C. and a color of H on the rosin scale.

*Example 2*

In this example the dimer of allo-ocimene was prepared by polymerizing an impure allo-ocimene mixture obtained by the pyrolysis of α-pinene. The original pyrolysis mixture was concentrated such that the raw material employed in this example consisted of 60% allo-ocimene and about 40% of monocyclic terpenes. 5300 parts of this allo-ocimene mixture were vigorously agitated with 1850 parts of 85% orthophosphoric acid at 25 to 30° C. for a period of 30 hours. The orthophosphoric acid was then separated, and the product water washed. The unpolymerized terpenes were removed from the product by means of vacuo distillation at 15 mm. The residue which consisted of polymerized allo-ocimene was vacuo distilled as follows:

| Fraction | Weight | Vapor temp. | Pressure |
| --- | --- | --- | --- |
|  | Parts | °C. | Mm. |
| 1 | 210 | 135 to 150 | 2 to 11 |
| 2 | 2,578 | 135 to 185 | 2 to 5 |
| Residue | 497 |  |  |

Fraction 2 had a molar weight of 265 (Rast) and a thiocyanate number of 185. It will be noted that the dimer prepared from the substantially pure allo-ocimene had a similar thiocyanate number. Monocyclic terpenes which have been polymerized with phosphoric acid will have thiocyanate numbers ranging from 80 to 110. Hence, it is apparent that fraction 2 consisted substantially entirely of the allo-ocimene dimer.

To 2300 parts of fraction 2 were added 928 parts of maleic anhydride, and the mixture was heated under an air condenser to 200° C. with agitation over a period of 25 minutes. Heating was continued for one hour at the end of which period the temperature had reached 250° C. Unreacted constituents were removed by distillation at a bath temperature of 220° C. and a pressure of 4 to 6 mm., leaving 2600 parts of condensate as residue. The theoretical yield on the basis of the allo-ocimene dimer is 3130 parts. Hence, an 83% yield was obtained. The product had an acid number (pyridine) of 310, a drop melting point of 88° C. and a color of H on the rosin scale.

*Example 3*

An allo-ocimene dimer was prepared by heating 98% allo-ocimene in an atmosphere of $CO_2$ with agitation at 190 to 200° C. for 24 hours. The reaction mixture was vacuum distilled as in Examples 1 and 2 to remove any unpolymerized terpenes. The residue was further vacuum distilled over sodium hydroxide to give an allo-ocimene dimer having a thiocyanate value of 175. 545 parts of this dimer were heated for one hour with 150 parts of maleic anhydride with agitation at 200 to 240° C. in an atmosphere of $CO_2$ under an air condenser. The reaction mixture was vacuum distilled at a bath temperature of 200 to 250° C. and at a pressure of from 1 to 5 mm., in order to remove any unreacted allo-ocimene dimer. A residue of 560 parts of condensate remained which corresponds with a substantially quantitative yield on the basis of the maleic anhydride. The condensate had an acid number (pyridine) of 315, a color of I on the rosin scale, and a drop melting point of 88° C.

*Example 4*

The decahydronaphthalene employed as solvent in this example was vacuum distilled over sodium hydroxide to remove traces of oxidized bodies prior to its use.

A mixture of 272 parts of the allo-ocimene dimer prepared as in Example 3, 98 parts of maleic anhydride and 300 parts of decahydronaphthalene was refluxed in an atmosphere of $CO_2$ for a period of 10 hours at 200° C. At the end of the reaction period the decahydronaphthalene was removed by vacuo distillation, and the unreacted allo-ocimene dimer was removed by further vacuo distillation at a bath temperature of 200° C. to 250° C. and a pressure of 1 to 5 mm. 320 parts of condensate remained which had an acid number (pyridine) of 310, a color of G on the rosin scale, and a drop melting point of 90° C. This corresponded to a yield of 89.0% on the basis of the allo-ocimene dimer.

Example 5

The following example illustrates the result obtained when terpene polymers are condensed with maleic anhydride in accordance with the methods of the prior art.

Wood turpentine in the amount of 1400 parts and 940 parts of 85% orthophosphoric acid were agitated for 24 hours at 25 to 35° C. The mixture was water washed to remove the catalyst and then distilled in vacuo. The fraction distilling over between 175° C. and 235° C. at 17 to 18 mm. pressure was collected. 730 parts of a product were thus obtained having a molecular weight of 270 (Rast determination) and a thiocyanate number of 85. This product consisted entirely of cyclic terpene dimers.

To 272 parts of the above product were added 110 parts of maleic anhydride and the mixture heated for 2 hours at 210° C. to 230° C. with agitation under an air condenser. Vacuum distillation of the reaction mixture at a bath temperature of 210° C. to 240° C. and at a pressure of 10 mm. left a residue of 100 parts of condensate. This condensate had an acid number (pyridine) of 150, and a melting point by the drop method of 55° C. On the basis that one mol of dimeric terpenes reacts with one mol of maleic anhydride, the pure addition product should have a theoretical acid number (pyridine) of 303. On this basis, the condensate obtained in this example was approximately 50% pure. Hence, the yield on the basis of the terpene dimer employed in this example is approximately 14%.

While maleic anhydride is the preferred reactant to use in accordance with this invention, it is quite possible, and sometimes desirable, to use maleic acid or its isomer, fumaric acid. In addition, other unsaturated acids or anhydrides, such as, citraconic, aconitic, itaconic, acrylic, methacrylic, α-crotonic, and β-crotonic acids may be employed. In fact, any unsaturated organic acid or anhydride which has a point of unsaturation between the alpha- and beta-carbon atoms, which acid contains no more than 6 carbon atoms may be employed. These unsaturated organic acids are characterized by their comprising the

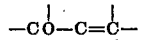

group. Furthermore, it is contemplated that the alkyl esters of the aforesaid acids may also be employed in carrying out the processes of this invention, but these are also less preferable than is maleic anhydride.

The dibasic acids and anhydrides of this invention are particularly useful in the preparation of salts and also various mono- and polyhydric alcohol esters. Thus, the cobalt, manganese and lead salts may be employed as driers in varnishes. These salts possess the advantage of compatibility with varnish oils and solvents because of the cyclic nature of the condensate from which the salts are made. The aluminum salt in particular is useful in the sizing of paper. The esters prepared from the acids and anhydrides of this invention may be used in the manufacture of protective coatings, textile chemicals, plastics and adhesives. Since the condensates of this invention possess unsaturated double bonds, they may be hydrogenated in the presence of various hydrogenation catalysts.

The products prepared in accordance with this invention are distinguished from the terpene maleic anhydride condensation products of the prior art in that they are considerably lighter in color and are obtainable in higher yield as is evident from the examples given. Shorter reaction periods and/or less drastic conditions need be employed in the production of these new condensation products.

It will be realized that wherever melting point is referred to in this application, there is contemplated that which is determined by the Hercules drop method.

It will be understood that the details and examples hereinbefore set forth are illustrative only and that the invention as broadly described and claimed is in no way limited thereby.

What I claim and desire to protect by Letters Patent is:

1. The product of the reaction of a polymer of an acyclic terpene having three double bonds per molecule and a material selected from the group consisting of the α,β-unsaturated organic acids and acid anhydrides, which material contains less than 7 carbon atoms per molecule, said reaction being carried out at a temperature within the range of from about 150° C. to about 300° C.

2. The product of the reaction of polymerized allo-ocimene and a material selected from the group consisting of the α,β-unsaturated organic acids and acid anhydrides, which material contains less than 7 carbon atoms per molecule, said reaction being carried out at a temperature within the range of from about 150° C. to about 300° C.

3. The product of the reaction of polymerized allo-ocimene and an α,β-unsaturated organic acid anhydride which has less than 7 carbon atoms per molecule, said reaction being carried out at a temperature within the range of from about 150° C. to about 300° C.

4. The product of the reaction of the dimer of allo-ocimene and an α,β-unsaturated organic acid anhydride which has less than 7 carbon atoms per molecule, said reaction being carried out at a temperature within the range of from about 150° C. to about 300° C.

5. The product of the reaction of the dimer of allo-ocimene with maleic anhydride, said reaction being carried out at a temperature within the range of from about 150° C. to about 300° C.

6. The product of the reaction of polymerized myrcene and a material selected from the group consisting of the α,β-unsaturated organic acids and acid anhydrides, which material contains less than 7 carbon atoms per molecule, said reaction being carried out at a temperature within the range of from about 150° C. to about 300° C.

7. The product of the reaction of polymerized myrcene and an α,β-unsaturated organic acid anhydride which has less than 7 carbon atoms per molecule, said reaction being carried out at a temperature within the range of from about 150° C. to about 300° C.

8. The product of the reaction of the dimer of myrcene and an α,β-unsaturated organic acid anhydride which has less than 7 carbon atoms per molecule, said reaction being carried out at a temperature within the range of from about 150° C. to about 300° C.

9. The product of the reaction of the dimer of myrcene with maleic anhydride, said reaction being carried out at a temperature within the range of from about 150° C. to about 300° C.

10. The product of the reaction of polymerized ocimene and a material selected from the group consisting of the α,β-unsaturated organic acids and acid anhydrides, which material contains less than 7 carbon atoms per molecule, said reaction being carried out at a temperature within the range of from about 150° C. to about 300° C.

11. The product of the reaction of polymerized ocimene and an α,β-unsaturated organic acid anhydride which has less than 7 carbon atoms per molecule, said reaction being carried out at a temperature within the range of from about 150° C. to about 300° C.

12. The product of the reaction of the dimer of ocimene and an α,β-unsaturated organic acid anhydride which has less than 7 carbon atoms per molecule, said reaction being carried out at a temperature within the range of from about 150° C. to about 300° C.

13. The product of the reaction of the dimer of ocimene with maleic anhydride, said reaction being carried out at a temperature within the range of from about 150° C. to about 300° C.

14. The method of producing a resinous composition which comprises reacting at a temperature within the range of 150° C. to 300° C. a polymer of an acyclic terpene having three double bonds per molecule and a material selected from the group consisting of the α,β-unsaturated organic acids and acid anhydrides, which material contains less than 7 carbon atoms per molecule.

15. The method of producing a resinous material which comprises reacting polymerized alloocimene and maleic anhydride at a temperature within the range of from about 150° C. to about 300° C.

16. The method of producing a resinous material which comprises reacting polymerized alloocimene and maleic anhydride at a temperature within the range of from about 175° C. to about 250° C.

17. The method of producing a resinous material which comprises reacting polymerized alloocimene and maleic anhydride at a temperature within the range of 150° C. to 300° C. and removing the excess of the reactants by reduced pressure distillation.

ALFRED L. RUMMELSBURG.